2,522,378

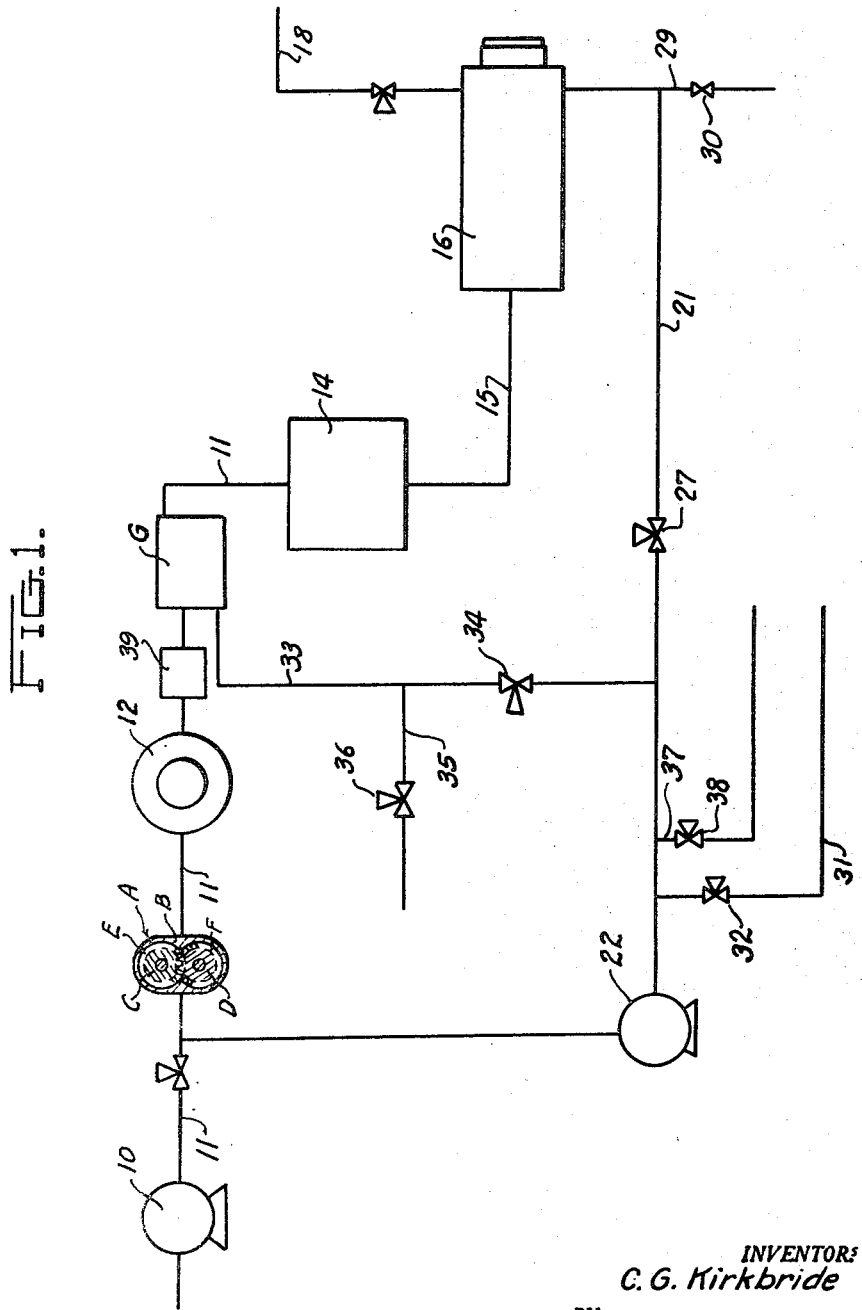
Sept. 12, 1950  C. G. KIRKBRIDE  2,522,378
RESOLVING WATER AND OIL EMULSIONS
Filed May 22, 1946  2 Sheets-Sheet 1
INVENTOR:
C. G. Kirkbride
BY
ATTORNEYS Sept. 12, 1950        C. G. KIRKBRIDE        2,522,378
RESOLVING WATER AND OIL EMULSIONS
Filed May 22, 1946        2 Sheets-Sheet 2
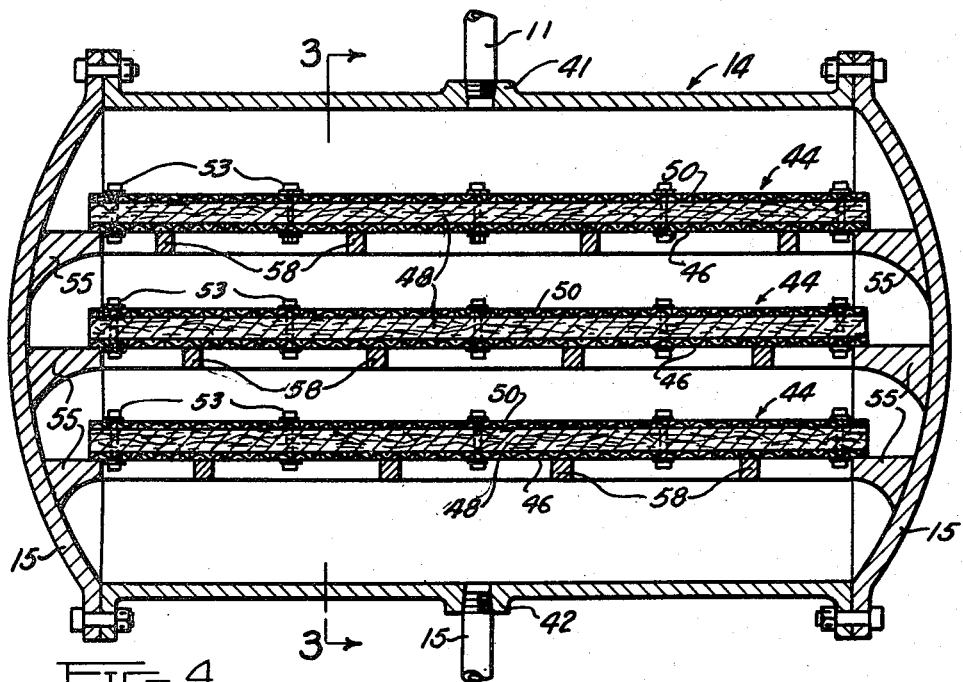
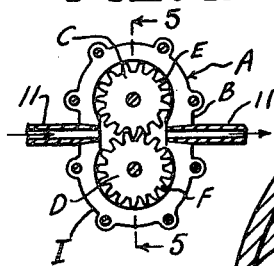
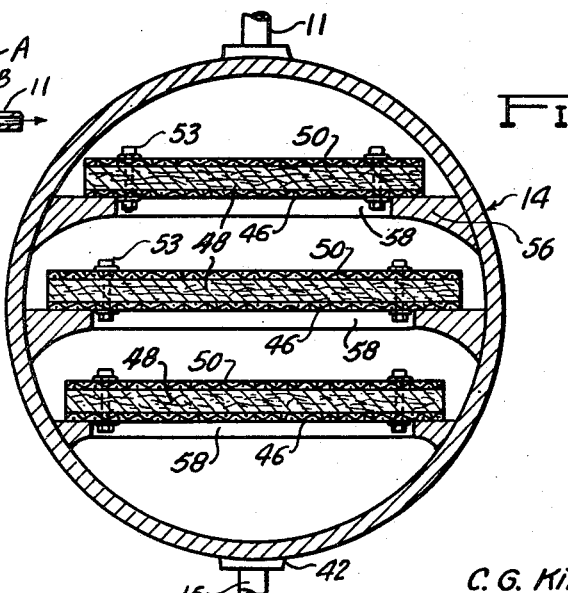
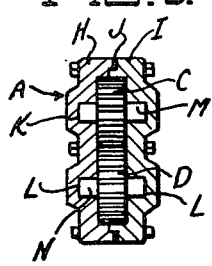
INVENTOR
C. G. Kirkbride
BY
ATTORNEYS Patented Sept. 12, 1950

UNITED STATES PATENT OFFICE 2,522,378

RESOLVING WATER AND OIL EMULSIONS

Chalmer G. Kirkbride, College Station, Tex., assignor of one-half to Owens-Corning Fiberglas Corporation, a corporation of Delaware, and one-half to Standard Oil Company (Indiana), a corporation of Indiana Application May 22, 1946, Serial No. 671,576

5 Claims. (Cl. 252—324)

This invention relates to the demulsification of oils and more particularly to resolving petroleum emulsions of the water-in-oil type and especially those which contain fine droplets of naturally occurring brines dispersed throughout the oil as a discontinuous phase.

These petroleum emulsions contain varying percentages of salt water, the crude petroleum known as "Panhandle" crude containing, for instance, for each thousand barrels of crude oil as high as 400 pounds of salt in solution in the aqueous phase of the emulsion. This salt content must be greatly reduced before the crude oil is refined.

It has been suggested that petroleum and other oil emulsions might be resolved by passing the emulsion through a mass of fibrous glass to cause the dispersed droplets to coalesce and settle out of the emulsion. The efficiency of such a process is dependent in large part on the use of fine glass fibers, that is, fibers of diameters less than about .0004 of an inch, to provide an enormous surface area relative to the volume of the glass of the fibers. This large area of surface preferentially wetted by water provides an effective means for coalescing or agglomerating the dispersed water droplets.

In the treatment of petroleum containing naturally occurring brines as the dispersed phase, it is also proposed to mix water or a water solution with the petroleum emulsion prior to passing the latter through a mass of fibrous glass. The purpose of the mixing operation is to wash the crude oil so that the emulsified water or brine is diluted. In the washing operation, a secondary or relatively unstable emulsion is formed but the droplets are of a size capable of being readily agglomerated or coalesced upon being passed through the fibrous glass. Careful observation leads us to believe that there are two forces which act on the emulsion as it passes through the fibrous glass. One force results from the molecular attraction of the water by the glass fiber surfaces which tends to coalesce the droplets and assist demulsification. The other is the mechanical force which acts on the droplets as the emulsion passes through the circuitous or irregular paths formed by the fibers and has a tendency to again mix the water and oil. This latter action is not conducive to efficient demulsification and is aggravated by the presence of excess water during the passage of the emulsion through the mass of glass fibers.

It is therefore one of the objects of this invention to minimize the deleterious effects resulting from the presence of excess water as the emulsion passes through the fibrous glass. This is accomplished by eliminating excess water from the emulsion prior to introducing the latter to the coalescing chamber. The eliminating of excess water from the emulsion subsequent to the mixing operation and prior to introduction of the mixture into the coalescing zone reduces the pressure drop through the fibrous glass and minimizes the tendency of the emulsion to follow only one or a relatively few paths through the fibrous glass.

Another object of this invention is to mix the oil and water by agitating it to form an intimate mixture without producing a stable secondary emulsion.

A further object of this invention is to provide a mixing device in the form of intermeshing gears that may perform the additional functions of introducing the petroleum to the coalescing chamber and forcing water into the mixing or pump chamber.

These and other objects will be apparent from the following description in connection with the drawings, in which:

Figure 1 is a schematic illustration of one type of equipment that may be used in the present invention;

Figure 2 is a central longitudinal sectional view of the contactor receptacle containing fibrous glass;

Figure 3 is a cross-sectional view of the same taken in the plane of the line 3—3 of Figure 2;

Figure 4 is a central vertical cross-sectional view of the mixer for introducing water into the oil stream; and Figure 5 is a cross-sectional view of the same taken in the plane of the line 5—5 of Figure 4.

Referring to Figure 1, the crude oil emulsion to be resolved is passed by suitable means such as a conventional pump 10 through a pipe line 11 and is heated in any ordinary manner, as by a heater 12 of conventional kind connected in the pipe line, to raise the temperature of the crude oil to about 200° to 400° F. and preferably about 250° to 300° F. At such temperatures resolution of the emulsion has been found to proceed with increased efficiency. The heated petroleum emulsion is passed by means of the pipe 11 through a mass of fine glass fibers held in a contactor receptacle 14. The dispersed phase of the emulsion is agglomerated or coalesced by the glass fibers in the receptacle so that the emulsion is broken. The resolved emulsion is then passed through a pipe 15 into an ordinary settling chamber 16 such as that conventionally used in emulsion resolving processes and while in the chamber the agglomerated brine droplets settle out of the crude petroleum by gravity and collect at the bottom of the chamber. The oil is removed from the settling chamber through a line 18.

The lower part of the settling chamber 16 is connected by a line 21 to a pump 22 which feeds the water from the chamber to the petroleum supply line 11 at a point down-stream from a gear mixer A. The mixer is connected in the line preferably down-stream from the heater 12, and the discharge side of the heater is connected to the contactor or coalescing receptacle 14. The quantity of brine admitted to the line 11 in advance of the intake side of the mixer A is controlled by a manually or automatically operated valve 27 and the excess brine from the settling chamber 16 is drawn off by a pipe 29 controlled by a valve 30.

In the present instance, the mixer A serves to intimately mix the crude oil and brine without producing a stable secondary emulsion. Particularly satisfactory results have been obtained by employing a gear type mixer comprising a housing B and a pair of intermeshing gears C and D. The important benefit of such a mixer over other types is that close contact between water and oil is obtained without forming a stable secondary emulsion. The inner surface E of the upper section of the housing conforms to the periphery of the gear C and is arranged in close proximity to the radially outer ends of the teeth on this gear. The inner surface F of the lower portion of the housing is formed to have the same relationship with the gear D.

The construction of the mixer A may be the same as a conventional gear pump. Preferably it is constructed as illustrated in Figures 4 and 5. The housing B is made in two parts H and I clamped together by bolts and having a gasket J between their interengaging edges. Each part of the housing is provided with bearing recesses K and L, which open only to the interior of the housing, and which rotatably receive journal studs M and N on the gears C and D. This structure makes unnecessary any stuffing box arrangements for the gear journal mountings.

As the stream passes through the mixer the intermeshing gears are rotated in the housing by the stream and the liquids to be mixed, the crude emulsion and water, are brought into close contact prior to feeding the same to the heater 12. The intermeshing teeth on the gears form, in effect, a circuitous passage which brings the water in intimate contact with the emulsion and meshing of the teeth acts to press the water and emulsion together with little dissipation of mechanical energy. This mixing permits the emulsion to be washed with water without formation of a stable secondary emulsion.

Instead of the gears being rotated by the fluid passing through the mixer they may be driven if desired to decrease the resistance to flow through the gears and control the rate of rotation of the gears. In such case, the journal stud of one gear is extended to the outside of the pump casing through a conventional stuffing box and coupled to an ordinary driving means such as an electric motor.

The amount of recycled wash water added to the crude oil at the mixer A is sufficient to have a substantial diluting effect on the relatively small amount of brine in the original emulsion with noticeable gain in the ease with which the emulsion is resolved. Water added to the crude oil emulsion in amounts of about .1 to .5 volume per volume of crude oil emulsion and preferably from about 0.1 to 0.2 volume per volume of crude oil emulsion have been found sufficient to effect these results. While all of the water added at the mixer might be fresh water, nevertheless, economical heat balance on the process is maintained if the wash water added is at least in part recycled.

The salt content of the recycled wash water is controlled so that the concentration of salt in the recycled water is less than 7% or more than 20% and preferably not more than 3% by weight. This range has been found important in that salt concentrations intermediate these proportions, that is, more than about 7% by weight and less than about 20% by weight, result in emulsions that are so difficult to break that the oil leaving the settling chamber has been found on occasion to contain more salt than the original crude oil. Apparently the crude oil emulsion being processed picked up some salt from the recycled brine. Best results are ordinarily obtained if the salt content of the recycled brine is less than 7% by weight.

The salt content of the recycled brine may be controlled by adding fresh water to the recycled wash water at a suitable point as through the pipe 31 connected with the pipe 21 leading to the pump 22, the pipe 31 having therein a manually controlled valve 32.

The oil-water mixture from the mixer A consists of free water and also water actually emulsified with the oil. This free water has a tendency to retard coalescence of the water actually emulsified in the oil as the stream passes through the fibrous glass in the receptacle 14. This is believed due to the tendency of the free water to emulsify with the oil and form a stable emulsion by the action resulting from passage of the dispersed phase of the emulsion through the circuitous passages formed by the fibrous glass.

This free water is removed from the emulsion prior to introducing the latter to the coalescing receptacle 14 and this may be accomplished by locating a second settling chamber G of conventional kind in the line between the mixer A and the receptacle 14, preferably after the heater. Any dispersed droplets which are not present as emulsion tend to settle out in the chamber G. This water may be fed to the line 21 through the pipe 33 having a valve 34 therein, or drawn off by a pipe 35 and valve 36. The emulsion is conducted from the chamber G to the receptacle 14 where the dispersed phase is agglomerated or coalesced by the fibers in the receptacle.

It has been found highly desirable to decrease the alkalinity of the crude emulsion before it enters the contactor. This is best accomplished by adding acid to the recycled brine as by a pipe 37 connected with the pipe 21 in advance of the intake side of the pump 22. A valve 38 may be provided in the pipe 37 for controlling the amount of acid fed into the brine. The acid added to the brine is preferably a corrosion inhibited sulfuric acid of conventional kind. Other acid such as hydrochloric may be used instead. The amount of acid added to the brine is preferably sufficient to maintain the pH of the brine being added to the crude oil less than about 9.0 and preferably between 7.0 to 8.0. When the recycled brine is maintained within this range or at least less than 9.0 and is added to the crude oil in the amount specified, no perceptible deterioration results from exposure of the fibrous glass to the oil and brine emulsion. In cases where the fresh water added to the recycled brine is also alkaline, additional acid will have to be added to likewise neutralize this excess alkalinity.

When desired, as when emulsions having therein a large proportion of silt are processed, an ordinary plate filter 39 may be provided in the line 11 in advance of the settling chamber G.

As shown in Figures 2 and 3, the contactor receptacle 14 may be in the form of a cylindrical tank having detachable heads 15 bolted thereto. The free side of the receptacle has a threaded opening 41 to receive the end of the pipe 11 and the opposite side of the tank is provided with a threaded opening 42 into which the pipe 15 is fitted.

Supported within the receptacle are a plurality of beds 44 each comprising a lower foraminous plate 46 which may be of perforated metal, heavy wire screen or the like. There are preferably three beds, although more may be provided if desired. Overlying the lower plate 46 is a mass 48 of fibrous glass held in compacted relation by an upper foraminous plate 50 which may also be of perforated metal or heavy wire screen. The plates 46 and 50 are clamped together as by means of bolts 53 passing through aligned openings in the plates and holding the plates together in fixed spaced relation.

The beds 44 are located in spaced relation and extend entirely across the receptacle so that the emulsion entering at the opening 41 and leaving through the opening 42 must pass through all of the beds in series. Each of the beds is supported at its ends on shelves or brackets 55 extending inwardly from the heads 15 and along its sides by shelves or brackets 56 extending inwardly from the side walls of the receptacle. Supporting bars 58 are joined at their ends to the brackets 56 and extend across the receptacle to support the beds at spaced intervals along their length. The beds are thus independently supported in the receptacle.

The joints between the lower plate 46 of each bed and the supporting brackets 55 and 56 are preferably sealed by means of gaskets to prevent leakage of the emulsion past the beds.

When it is desired to replace the fibrous glass of the beds 44 one head 15 of the receptacle is removed and the beds are drawn out endwise from the receptacle. The plates 46 and 50 of the beds are then unbolted and the fibrous glass removed from the bed and replaced with new. Ordinarily, the fibrous glass in the upper bed, that is, the one through which the emulsion is first passed, is rendered unserviceable during the operation and requires replacement before the lower beds. Of course all of the beds may be replaced at the same time if desired.

It has been found desirable to employ fibrous glass in which the individual fibers are from about .0001 to .0004 inch in diameter, and preferably about .00025 to .0003 inch in diameter. The fibrous material is best in the form of masses of loosely assembled intermatted fibers of from 8 to 15 or 20 inches in length, or in the form of bats or blankets of such fibers. These fibers are packed in the beds of the receptacle in such quantities and at such densities that when the beds are subjected to the pressure drop of the emulsion passing therethrough the beds will be compressed to the desired thickness, say about 2 inches thick. Beds may be of less thickness if the decrease in thickness is compensated by additional beds, so that the length of the aggregate path through the beds is about 5 to 7 or more inches in length.

By employing beds of approximately 2 inches in thickness and made up of fibers whose diameter is from about .00021 to .00030, it has been found possible to maintain the pressure drop across each bed less than about 50 pounds per square inch while obtaining a superficial flow of fluid through the receptacle of about .1 to 1.0 feet per minute based on the oil phase only of the crude oil. Pressure drops through each bed of less than 50 pounds per square inch have been found to have no perceptible crushing effect on the fibrous glass, while if the amount of fibrous material represented by the plurality of beds were combined in a single bed, the resultant pressure drop through the bed would, within a period of several hours, crush the fibers to such an extent that they would have to be replaced because of ineffectiveness in resolving the emulsion. The interruption in the process required to replace the fibrous material would, of course, materially detract from the efficiency of operation. The pressure drop through the bed is further reduced by removing the free water from the dispersion phase of the emulsion in the preliminary settling chamber G prior to introducing the emulsion to the receptacle 14.

The efficiency of the present process is such that the salt content of naturally occurring emulsions of brine and crude oil can, in substantially all cases, be reduced to a maximum of 5 pounds of salt for each thousand barrels of oil by employing an aggregate depth of the beds of fibrous glass of about 6 inches and passing the crude oil emulsion through the beds seriatim at a superficial velocity of about .1 to 1.0 feet per minute based on the oil phase only. With increase in aggregate thickness of the beds, the superficial velocity may be increased, it being usually preferable to observe a ratio of aggregate bed thickness to superficial velocity of not less than about .2, where the bed thickness is expressed in inches and the superficial velocity in feet per minute. This ratio may be much higher if the allowable salt content of the oil from the process is in excess of the above specified maximum. Also operation at higher ratios presents a more favorable condition for resolving the emulsion and accordingly the ratio should be as high as is possible while obtaining the removal of the required amount of brine.

The invention is also useful in resolving other kinds of emulsions of water-in-oil such as those encountered sometimes in edible oil processing and at intermediate stages in the processing and refining of petroleum and chemicals.

Various modifications may be made within the spirit of the invention and the scope of the claims.

I claim:

1. The process of resolving crudes containing brine as the dispersed phase in oil which comprises the steps of increasing the volumetric ratio of the aqueous phase to the oily phase by adding 0.1 to 0.5 volume aqueous medium to 1 volume of crude, intimately mixing the components without producing a stable secondary emulsion, adjusting the pH of the mixture to between 7 and 9, separating from the mixture that portion of the aqueous phase which is not emulsified with the oil and settles out, coalescing the dispersed phase of the emulsion by passing the latter through a contacting mass of fibrous glass, and then removing the coalesced dispersed phase which settles out of the oily phase.

2. The process of resolving crudes containing brine as the dispersed phase in oil which comprises the steps of increasing the volumetric ratio of the aqueous phase to the oily phase by adding an aqueous medium to provide for a salt concentration in the mixture which is outside the range of 7 to 20 percent by weight, intimately mixing the components without producing a stable secondary emulsion, separating from the mixture that portion of the aqueous phase which is not emulsified with the oil and settles out, coalescing the dispersed phase of the emulsion by passing the latter through a contacting mass of fibrous glass, and then removing the coalesced dispersed phase which settles out of the oily phase.

3. The process of resolving crudes containing brine as the dispersed phase in oil which comprises the steps of increasing the volumetric ratio of the aqueous phase to the oily phase by adding 0.1 to 0.5 volume aqueous medium to 1 volume of crude, intimately mixing the components without producing a stable secondary emulsion, heating the mixture to a temperature between 200 and 400° F., separating from the mixture that portion of the aqueous phase which is not emulsified with the oil and settles out, coalescing the dispersed phase of the emulsion by passing the latter through a contacting mass of fibrous glass, and then removing the coalesced dispersed phase which settles out of the oily phase.

4. The process of resolving crudes containing brine as the dispersed phase in oil which comprises the steps of increasing the volumetric ratio of the aqueous phase to the oily phase by adding 0.1 to 0.5 volume aqueous medium to 1 volume of crude, intimately mixing the components without producing a stable secondary emulsion, separating from the mixture that portion of the aqueous phase which is not emulsified with the oil and settles out, coalescing the dispersed phase of the emulsion by passing the latter through a contacting mass of fibrous glass at a rate of 0.1 to 1.0 feet per minute based upon the oily phase, and then removing the coalesced dispersed phase which settles out of the oily phase.

5. Apparatus for resolving water-in-oil emulsions comprising a receptacle having an entrant side and a delivery side, a mass of closely packed fibrous glass supported in the receptacle between said sides and arranged in separated layers to provide for a pressure drop of less than 50 pounds per square inch thereacross each layer, a mixer having an intake side communicating with sources of oil and water and having means for intimately mixing the oil and water during the interval the latter passes from the intake side of the mixer to the discharge side of the latter, means for conducting the mixture under pressure to the entrant side of the receptacle, and a settling chamber interposed between the discharge side of the mixer and entrant side of the receptacle to remove free water from the mixture.

CHALMER G. KIRKBRIDE.

REFERENCES CITED

The following references are of record in the file of this patent:

UNITED STATES PATENTS

| Number | Name | Date |
| --- | --- | --- |
| 1,617,737 | Averill | Feb. 15, 1927 |
| 1,947,709 | Garrison et al. | Feb. 20, 1934 |
| 2,116,380 | Bauer | May 3, 1938 |
| 2,228,353 | Howes | Jan. 14, 1941 |
| 2,273,915 | Wellman | Feb. 24, 1942 |
| 2,355,078 | Johnson | Aug. 8, 1944 |
| 2,402,844 | Roberts | June 25, 1946 |
| 2,420,115 | Walker et al. | May 6, 1947 |
| 2,454,605 | Kirkbride | Nov. 23, 1948 |

OTHER REFERENCES

Filtering by Means of Spun Glass, article in the Scientific American, vol. 123, page 593, Dec. 11, 1920.